April 1, 1958          H. W. LORD          2,829,338
TEST TRANSFORMER FOR RING-TYPE MAGNETIC CORES
Filed May 13, 1954          2 Sheets-Sheet 1
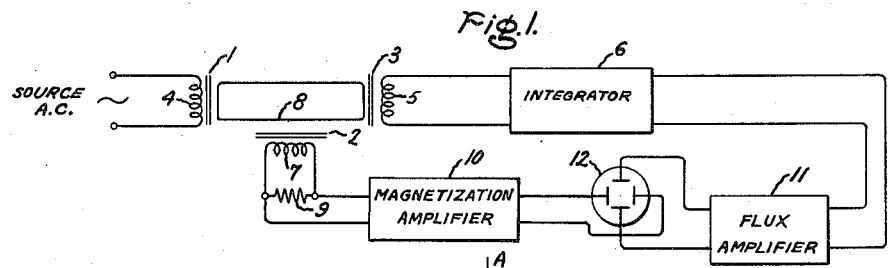
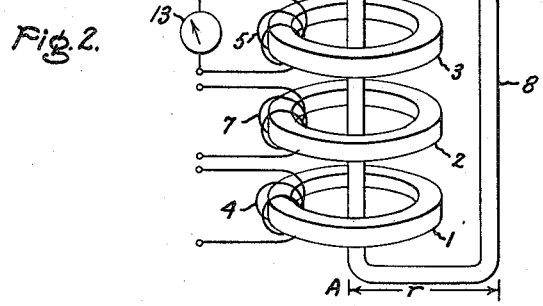
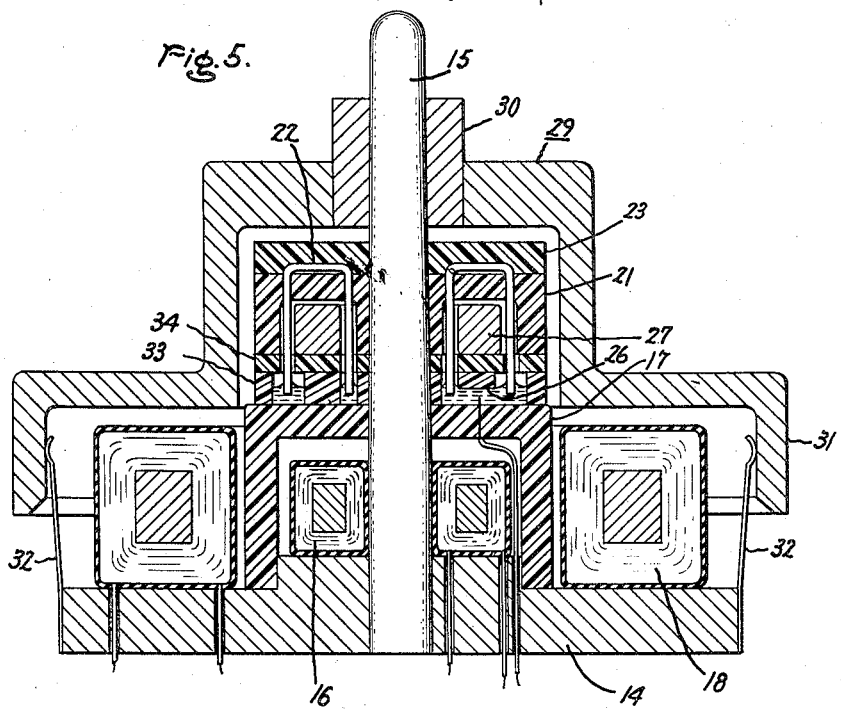
INVENTOR.
Harold W. Lord,
BY Paul A. Frank
His Attorney.

April 1, 1958 H. W. LORD 2,829,338
TEST TRANSFORMER FOR RING-TYPE MAGNETIC CORES
Filed May 13, 1954 2 Sheets-Sheet 2

INVENTOR.
Harold W. Lord,
BY Paul A. Frank
His Attorney,

United States Patent Office 2,829,338
Patented Apr. 1, 1958

2,829,338

TEST TRANSFORMER FOR RING-TYPE MAGNETIC CORES

Harold W. Lord, Schenectady, N. Y., assignor to General Electric Company, a corporation of New York Application May 13, 1954, Serial No. 429,540

4 Claims. (Cl. 324—34)

My invention relates to an improved apparatus for testing samples of magnetic materials and is related to a test transformer for testing ring-type magnetic cores.

Strip-wound cores in the form of rings are being used in increasing numbers for high performance magnetic amplifiers. It is, therefore, necessary to evaluate large numbers of these cores and the apparatus of my invention is suited to be used for such testing.

It is, therefore, an object of my invention to provide an improved test transformer for testing magnetic materials.

Another object of my invention is to provide an improved test transformer for testing samples of magnetic materials which is characterized by low leakage due to the coupling of the excitation coils.

A further object of my invention is to provide an improved test transformer apparatus for testing ring-type cores of magnetic materials.

In the past evaluation testing of strip-wound cores posed a problem in that coils applied to them had to be wound in place on the core. In order to avoid the problem of winding an excitation coil in place on the core, certain workers in this field have resorted to cables terminated in multiple-contact plugs to facilitate the testing of these ring cores. Others have built jigs, carrying jumpers which were dipped into small cups of mercury so interconnected as to form multi-turn loops about the core under test. Such methods are useful at low frequencies of the order of a few hundred cycles. For testing at higher frequencies, the loose fit between the coil and core inherent in these types of arrangements leads to an undesirable amount of leakage reactance between the excitation coil and core. In order to reduce the leakage reactance component to a minimum and still retain some of the advantages of disconnectable excitation coils, I have devised the special testing transformer which will now be described.

Figure 4:
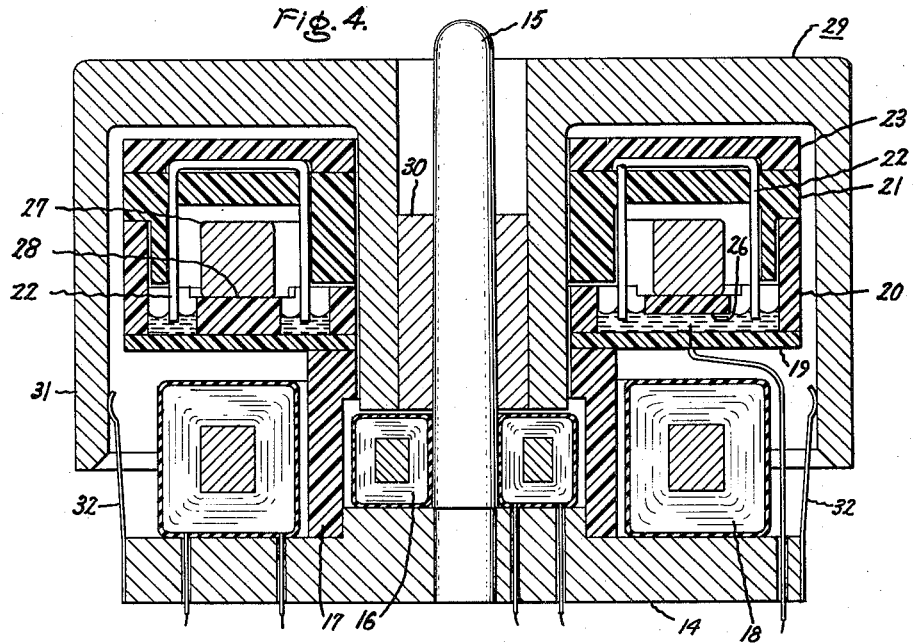
Figure 3:
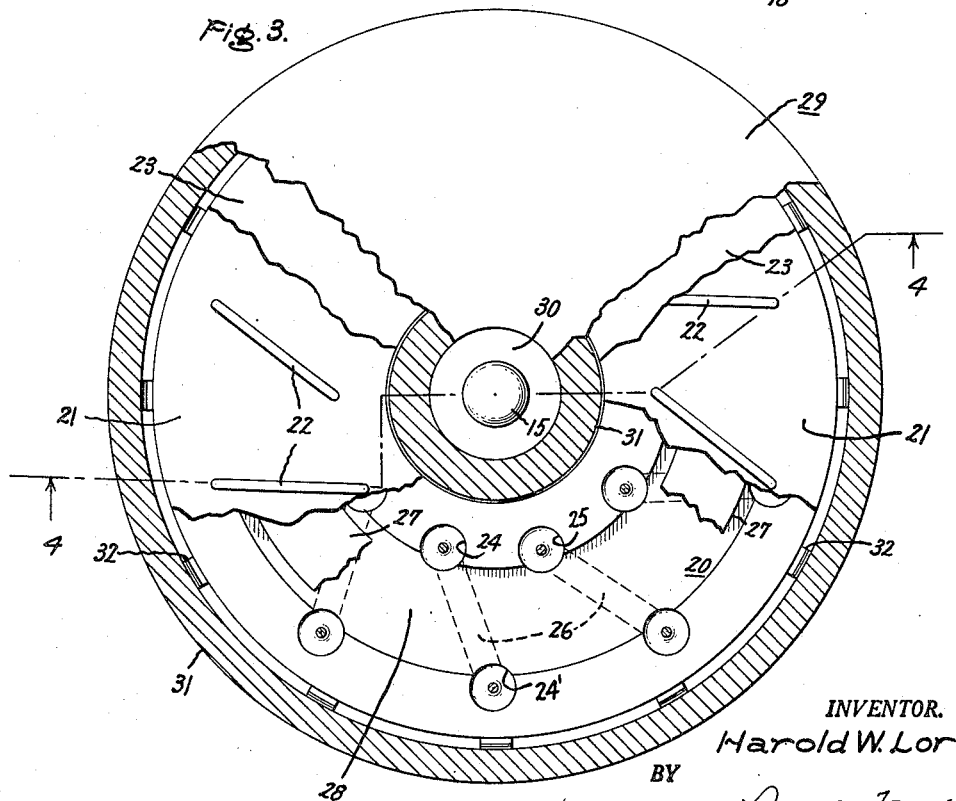

The invention will be understood more readily from the following detailed description when considered in connection with the accompanying drawings. In the drawing, Figure 1 is a part schematic and part block diagram of a complete test apparatus utilizing a test transformer of my invention; Figure 2 is a diagrammatic sketch of the transformer of my invention; Figure 3 is a plan view partially broken away and partially sectioned of one embodiment of my invention; Figure 4 is a sectional elevation view of the embodiment of Figure 3 taken along section 4—4 of Figure 3; and Figure 5 is a detailed sectional view of another embodiment of my invention.

Referring now to the drawing and in particular to Figure 1, there is illustrated a system for determining the parameters of a test specimen. Core 1 has wound thereon a winding 4 which is energized by a suitable source of alternating voltage. Core 3 is the specimen of magnetic material under test and is surrounded by a multi-turn loop 5 which is coupled to integrator 6. Core 2 is surrounded by coil 7 and forms a current transformer. Cores 1, 2 and 3 are linked by single-turn conductive loop 8. Therefore, the magnetizing force applied to core 1 is coupled to cores 2 and 3 by the current flowing in loop 8. A small low resistance resistor 9 is placed across current transformer coil 7 so that the voltage across resistor 9 is proportional to the magnetizing force applied to test specimen 3. This voltage across resistor 9 is amplified by magnetization amplifier 10 and applied to the horizontal plates of a cathode ray oscilloscope 12. The output of pick-up coil 5, which surrounds test specimen 3, is applied through the integrator 6, the flux amplifier 11 and will, when applied to the vertical plates of a cathode ray oscilloscope 12, give a visual indication of the flux in core 3. In this fashion, a hysteresis loop of flux as a function of magnetizing force may be obtained for the particular test specimen which in this case is diagrammatically illustrated by core 3. This invention is particularly related to the structure of the test transformer apparatus which embodies cores 1, 2 and 3 as well as energizing coil 4, current transformer coil 7, pick-up loop 5 and the single-turn coupling loop 8.

A diagrammatic illustration of the test transformer portion of the system of Figure 1 is illustrated in Figure 2. Like portions of the structure are characterized by the same reference numerals as those portions in Figure 1. As may be seen, in Figure 2, there are illustrated three cores of magnetic material, 1, 2 and 3. These cores have windings 4, 7 and 5, respectively, surrounding the cores so that a change in flux through the core results in an induced voltage at the terminals of these coils. The single turn conductive loop 8 links all three of the cores so that a change in current through loop 8 as a result of a change of flux in core 1 results in a change of flux in cores 2 and 3 and, therefore, a resulting voltage indication at the terminals of the respective coils surrounding these cores.

This becomes apparent when it is noted that a current flowing through coil 4 produces a magnetic field or flux in core 1. A voltage will be induced in coil 8 which is proportional to the rate of change of flux in core 1. Therefore, if an alternating or varying current is applied to coil 4, an alternating or varying voltage will be induced in loop 8. Since loop 8 links core 3 as well as core 2, a flux varying in accordance with the variation of the current in loop 8 will be produced in cores 2 and 3. Therefore, a voltage or current output will be produced in coils 5 and 7, respectively, which is a function of the applied magnetizing force or voltage coupled to the terminals of coil 4. An indicator such as meter 13 may be connected to the output of coil 5 to indicate the parameters of core 3.

A transformer similar to the transformer of applicant's invention may be produced by causing loop 8 to rotate about axis A—A to form an outer surface of revolution and to form a structure with a center pin running along axis A—A and an outer cylindrical surface with a radius r. By properly separating this cylinder along planes perpendicular to axis A—A and between coils 2 and 3 and supplying the necessary partitions, a test transformer structure in accordance with the transformer of my invention may be obtained.

Referring now to Figures 3 and 4 of the drawing, a specific embodiment of my test transformer will be described by way of example. The transformer consists of base 14 which may be made out of a suitable conductive material, such as brass or copper, a vertical pin member 15 which is mounted perpendicularly in the center of base 14. Base 14 is provided with a step on which current transformer core and secondary winding 16 is placed. Current transformer secondary and core 16 is toroidal in shape and fits snugly about pin 15 and onto the step on base 14. Annular member 17 which may be made out of any suitable insulating material is placed over the current transformer 16. Annular member 17 is provided with a circular opening in the top thereof. The primary or excitation core and coil 18 are then placed on the base 14 so that the excitation core is concentric with and surrounds the transformer 16. The test specimen pick-up coil interconnector, hereinafter referred to as the interconnector structure, is placed on top of annular member 17. The interconnector member consists of five parts; a base portion in the form of a disk 19 with a hole punched through the center thereof, an annular drilled and recessed member 20, a cup-shaped member 21, platinum wire loops 22 and a top cap 23.

The structure of a portion of the interconnection structure is clearly illustrated in Figure 3 to which specific reference is now made. The member 20 is provided with drilled holes such as 24, 24' and 25 as well as with recessed portions such as those designated by the reference numeral 26. Platinum loops 22 interconnect successive holes, such as 24' and 25, while holes 24 and 24' are interconnected by mercury which is held in a pool formed by the recess 26 in member 20 and the disk member 19 cemented to the bottom thereof. It may readily be seen that when a test specimen, such as specimen 27, is placed upon base portion 28 of member 20, it is completely surrounded by a multi-turn winding formed by the platinum loops 22 and the mercury interconnection formed by mercury filled recessed portions 26 between successive holes, such as holes 24 and 24'. Returning now to the showing of Figure 4, it may be seen that the successive platinum loops 22 are retained by cementing cap 23 to cup-shaped member 21 so that the specimen container consists of two sub-assemblies, namely members 19 and 20 with pools of mercury interconnecting successive pairs of holes and members 21 and 23 cemented together to retain platinum loops 22. Members 19, 20, 21 and 23 may be made out of any suitable insulating material. The transformer structure is completed by providing a cap 29 which consists of a beryllium copper bushing 30 provided with a Morris taper to fit snugly over a beryllium copper center pin 15 and cup-shaped member 31 which in this specific embodiment of my invention is made of brass. Connection between the brass cup-shaped member 31 and the brass base 14 is accomplished by a series of spring members made of beryllium copper and designated by the reference numeral 32. By using beryllium copper, the characteristics of low resistivity with a spring effect to maintain high contact pressure are achieved.

Coupling to the pick-up loops formed by loops 22 and the mercury pools is accomplished by inserting fine platinum wires through the base member 19 and bringing the leads therefrom out through base 14 in the illustrated manner. In a like manner, leads from energizing coil and core 18 and current transformer and coil 16 may be brought out through the base 14. This structure provides a very satisfactory retainer for the test specimen and a complete single-turn current loop is provided by the base 14, pin 15, bushing 30, brass cup-shaped member 31 and spring fingers 32. The above-described single-turn loop is the full equivalent of single-turn loop 8 of Figure 2 of the drawing.

The transformer may be utilized by removing cap 29 and the single unit formed by members 21, 22 and 23 from the base. A test specimen 27, which generally will be in the form of a toroidal core, is placed on surface 28 of member 20. Members 21, 22 and 23 are then placed over the test specimen thereby forming a multi-turn winding surrounding the test specimen. Cap 29 is then placed over the assembly thereby completing the test transformer structure. The output leads from the transformer are then coupled into a circuit of the general type illustrated in Figure 1 of the drawing, coil 18 is energized from a source of varying voltage so as to produce a sinusoidal flux variation in test specimen 27 and the output from the multi-turn loop formed by loops 22 and the mercury pools is applied to a suitable indicating instrument to indicate the characteristics of the test specimen.

It is noted that the pick-ups from the loops surrounding the test specimen are interconnected to provide a center-tapped multi-turn loop, that leads are shown coming from energizing core and coil 18 and two leads are taken from current transformer coil 16. These leads are needed in order to utilize the transformer test apparatus of my invention in a circuit and apparatus for testing test specimens which is further described and claimed in my co-pending application, Serial No. 429,539, filed concurrently herewith, and assigned to the assignee of this invention. It should be noted, however, that the number of leads coming from the various coils of my transformer is not critical nor to be considered limiting since any number of leads may be taken from the transformer coils of this apparatus in order to adapt it to a specific source of energizing power or to a specific indicating device.

Referring now to Figure 5, there will be seen another embodiment of my test transformer in which similar or like portions are designated by the same reference numerals. Since all parts are essentially the same as those described and discussed in the description of Figures 3 and 4, a detailed discussion of this figure is not considered necessary. It is noted that the structure of this figure is particularly adapted to the testing of a smaller-sized specimen of magnetic material and is shown by way of example of the various forms an apparatus in accordance with my invention may take. It is noted that the base of the interconnector structure is formed of members 33 and 34 which are cemented to cup-shaped member 17, thereby performing the function of members 19 and 20 of the embodiment of Figure 4.

It may readily be seen that the transformer of my invention provides a very satisfactory means of coupling the excitation source to the test specimen by means of the single-turn loop provided by the base, pin and outer cap. This form of coupling requires no winding be placed upon the test specimen, provides a relatively tight form of coupling between core and coil 18 and test specimen 27. The leakage reactance between the source of energization and the specimen under test is very much reduced and, therefore, a very definite improvement is realized over previously known structures which utilized varieties of plug-in loops. The transformer of my invention is easily assembled and disassembled and a specimen is prepared for testing by placing it in the transformer, replacing the insulated cap and the outer cap. The test transformer of my invention is satisfactory for testing specimens over a wide range of frequencies; for example, from 60 to 10,000 cycles.

The specific examples illustrated in the figures of the drawing and the materials mentioned in the description are given merely by way of example, since it will be readily appreciated by those skilled in the art that a transformer in accordance with my invention may take a large variety of forms and utilize a large variety of materials. Therefore, the described embodiments of my invention should not be considered as limiting the scope of my invention.

What I claim as new and desire to secure by Letters Patent of the United States is:

1. In an apparatus for determining the parameters of magnetic material, a first toroidal coil wound on a core of magnetic material, a second toroidal coil wound on a core of magnetic material and substantially surrounding and concentric with said first coil, support means for said first and second coils and providing a base for a test specimen of magnetic material, a first cup-shaped member including a plurality of metallic loops which form a multi-turn winding surrounding said test specimen when the cup is placed on said base and an annular cup-shaped member coupled to said support means and surrounding said test specimen to form a single turn conductive loop linking the first coil, the second coil and said test specimen.

2. An apparatus for determining the parameters of magnetic material, a first toroidal coil wound on a core of magnetic material, a second toroidal coil wound on a core of magnetic material and substantially surrounding and concentric with said first coil, support means for said first and second coils and providing a base for a test specimen of magnetic material, a first cup-shaped member including a plurality of metallic loops which form a multi-turn winding surrounding said test specimen when the cup is placed on said base and an annular cup-shaped member coupled to said support means and surrounding said test specimen to form a single turn conductive loop linking the first and second coils and said specimen, a source of varying magnetizing force coupled to said second coil, means coupled to said first coil to indicate the magnetizing force applied to said test specimen, and means coupled to said multi-turn winding to indicate the flux in said test specimen whereby an indication of the flux in said test specimen as a function of the magnetizing force applied to said specimen is obtained.

3. Apparatus for testing a generally annular specimen of magnetic material comprising separable cooperating conductive members defining and substantially enclosing an annular space, three annular magnetic cores including the specimen positioned in the annular space and linked by the conductive circuit provided by said conductive members, an exciting coil on one of said cores for producing a substantially sinusoidal flux in the specimen, a coil coupled with a second of said cores for deriving an indication of the magnetizing force applied to the specimen and a winding coupled to the specimen for deriving an indication of the flux change in the specimen.

4. Apparatus for testing a ring-shaped specimen of magnetic material comprising separable cooperating conductive members defining and substantially enclosing a ring-shaped space, three ring-shaped magnetic members including the specimen positioned in the space and linked by the conductive circuit provided by said conductive members, an exciting coil on one of said cores for producing a flux in the specimen, a winding coupled with a second of said cores for deriving an indication of the magnetizing force applied to the specimen and a winding coupled to the specimen for deriving an indication of the flux change in the specimen.

References Cited in the file of this patent

UNITED STATES PATENTS

| | | |
|---|---|---|
| 1,565,519 | Spooner | Dec. 15, 1925 |
| 1,570,948 | Crouch | Jan. 26, 1926 |
| 1,695,679 | Berlowitz | Dec. 18, 1928 |
| 2,202,884 | Zuschlag | June 4, 1940 |
| 2,679,025 | Rajchman et al. | May 18, 1954 |